United States Patent [19]

Wiese et al.

[11] Patent Number: 5,002,751

[45] Date of Patent: Mar. 26, 1991

[54] HIGHLY-COERCIVE ISOMETRIC IRON OXIDES, A PROCESS FOR THE PRODUCTION AND THE USE THEREOF

[75] Inventors: Jürgen Wiese; Gunter Buxbaum; Rolf Schäfer, all of Krefeld; Fritz Rodi, Moers, all of Fed. Rep. of Germany

[73] Assignee: Bayer Aktiengesellschaft, Leverkusen-Bayerwerk, Fed. Rep. of Germany

[21] Appl. No.: 767,900

[22] Filed: Aug. 21, 1985

[30] Foreign Application Priority Data

Sep. 1, 1984 [DE] Fed. Rep. of Germany ....... 3432224

[51] Int. Cl.$^5$ ............................................. C01G 49/02
[52] U.S. Cl. ................................... 423/632; 106/456; 430/107
[58] Field of Search ........................ 423/632; 106/304

[56] References Cited

U.S. PATENT DOCUMENTS

| | | | |
|---|---|---|---|
| 2,511,400 | 6/1950 | deJahn | 423/632 |
| 2,636,892 | 4/1953 | Mayer | 423/632 |
| 2,694,656 | 11/1954 | Camras | 252/62.56 |
| 2,904,402 | 9/1959 | Cauterman | 423/632 |
| 4,108,787 | 8/1978 | Masaki et al. | 252/62.56 |
| 4,140,539 | 2/1979 | Hand et al. | 106/304 |
| 4,221,776 | 9/1980 | Autzen et al. | 423/632 |
| 4,367,214 | 1/1983 | Sarnecki et al. | 423/632 |
| 4,497,723 | 1/1985 | Ohlinger et al. | 423/632 |

FOREIGN PATENT DOCUMENTS 2072639  10/1981  United Kingdom ................ 423/632

OTHER PUBLICATIONS

"Magnetic Oxides", Edited by D. J. Craik, 1975, John Wiley & Sons, N.Y., N.Y., pp. 698, 704 and 711.
"Feromagnetic Materials", edited by E. P. Wohlfarth, 1980, North-Holland Publishing Co., N.Y., N.Y., pp. 406, 442 and 463.

*Primary Examiner*—Olik Chaudhuri
*Assistant Examiner*—Robert M. Kuncmund
*Attorney, Agent, or Firm*—Connolly and Hutz

[57] ABSTRACT

Highly-coercive isometric iron oxide useful in magnetic toners for electrostatic photo-copying processes or for magnetic printers is produced by
(a) subjecting $Fe_3O_4$ pigment produced in a wet process to oxidation and
(b) subsequently reducing the oxidized pigment from (a) to produce highly-coercive $Fe_3O_4$ pigment.

8 Claims, No Drawings

HIGHLY-COERCIVE ISOMETRIC IRON OXIDES, A PROCESS FOR THE PRODUCTION AND THE USE THEREOF

BACKGROUND OF THE INVENTION

This application relates to a process for the production of highly-coercive isometric magnetic iron oxide pigments and to magnetic iron oxide pigments produced by this process and to the use thereof.

Magnetic iron oxide pigments of the composition $FeO_x$, wherein $1.33 \leq x \leq 1.5$, are used for the production of magnetic toners for electrostatic photo-copying processes or for magnetic printers. Isometric magnetite pigments having coercive field strengths ($I^Hc$) of from about 80 to 130 Oe are substantially used in conventional processes for this purpose. However, greater demands are made on these pigments in modern one-component toners. The coercive field strengths thereof have therefore to be within the range of from 180 to 250 Oe or above.

Two processes are essentially known at the present time for obtaining the coercive forces required. Those are:
1. by the incorporation of cobalt into the iron oxide pigments,
2. by the use of needle-shaped pigments.

However, the incorporation of cobalt is expensive and in addition causes an undesirable fall in the $I^Hc$ values as the temperature increases. Needle-shaped pigments produce directional dependence in the toner and rheological problems in the production thereof with the result that their use is accompanied by disadvantages.

DESCRIPTION OF PRIOR ART

Relatively highly-coercive $Fe_3O_4$ pigments (DE-OS No. 3 513 788), which are obtained via a salt melt process at a temperature of from 700° to 1,300° C., have also been proposed for single-component toners. However, salt melt processes are associated with corrosion and waste water problems and for this reason have not found their way into chemical technology.

Thus, an object of this invention is to provide a straight forward inexpensive process for the production of isometric magnetic iron oxide pigments for use in toners, which do not suffer from the disadvantages of processes in the prior art.

The starting materials for production of the high-coercive magnetic iron oxide pigment of this invention are known isometric pigments produced in a wet process, i.e., those pigments which are produced by the nitrobenzene reduction process (DE-PS No. 46 37 73), by a precipitation process from iron salts and alkalis (DE-OS No. 2 612 798), by a Penniman process in the presence of Fe-scrap (DE-OS No. 2 617 569) or by other processes in aqueous media known from the relevant literature. The $I^Hc$ values conventionally obtainable by these processes are limited to about 150 Oe, as the commercially obtainable products show.

SUMMARY OF THE INVENTION

It has now surprisingly been found that the coercive field strengths of isometric magnetic iron oxide pigments produced by a wet process can be dramatically raised to at least 180 Oe if they are subjected to a combined oxidation and heat treatment and are subsequently reduced and re-converted into $Fe_3O_4$ pigments.

DETAILED DESCRIPTION

Thus, this invention relates to a process for the production of highly-coercive isometric magnetic iron oxide pigments, having an $I^Hc$ value of at least 180 Oe, which is characterised in that
(a) $Fe_3O_4$ pigments produced in a wet process are oxidized and
(b) are subsequently reduced to produce relatively highly-coercive $Fe_3O_4$ pigments.

The relatively highly-coercive $Fe_3O_4$ pigments obtained in this manner can be
(c) oxidized in a further step to produce relatively highly-coercive $\gamma$-$Fe_2O_3$ pigments or bertholloid mixed phase pigments.

Oxidation according to step (a) of this invention is carried out until a substantial amount of the iron oxide is $Fe_2O_3$. Preferably, substantially complete conversion to $Fe_2O_3$ is achieved in step (a). The oxidation in step (a) can conveniently be carried out using gaseous oxidizing agents, such as air, at a temperature of from 200° to 950° C. A temperature of from 400° C. to 950° C. is preferred. The oxidation time depends on the ratio of the quantity of oxide to the quantity of air and on the temperature.

Reduction according to step (b) takes place with a reducing gas at a temperature of from 200° to 700° C., preferably from 300° to 500° C. Gaseous organic compounds, such as natural gas or carbon monoxide or more preferably hydrogen, can be used as a reducing gas. The hydrogen can be moistened to prevent over-reduction taking place. The oxidation time depends on the ratio of the quantity of oxide to the quantity of air and on the temperature. It is therefore not necessarily appropriate to state a time.

The magnetic $Fe_3O_4$ pigments obtained according to the invention are particularly suitable for the production of black toners or black magnetic printing dyes. The pigments which are oxidized to produce $\gamma$-$Fe_2O_3$ are advantageously used for the production of dyed toners. The present invention is illustrated in the following examples without this limiting the scope thereof. The maximum measuring field strength in determining the magnetic data is 4,000 G.

EXAMPLE 1

Wet production process by the nitrobenzene reduction process.

An $Fe_3O_4$ pigment is produced according to DE-PS No. 463 773 which is characterised by the following known values: average partical size = 0.5 $\mu$m, $I^Hc$ = 140 Oe, $M_s$ = 5000 G, obtained commercially under the trade name Bayferrox 8610 (BAYER AG) and used in toners.

Stage (a)

This product is oxidized for 30 mins. at 700° C. in air in a laboratory rotating furnace.

Stage (b)

The product is then reduced for 120 mins. at 400° C. with hydrogen which has been moistened at a temperature of 60° C. to produce black $Fe_3O_4$ pigments.

The following magnetic values are determined:
$I^Hc$ = 285 Oe.
$M_s$ = 4875 G.
average partical size 0.5 $\mu$m
specific BET surface area = 4 m$^2$/g.

EXAMPLE 2

The product from Example 1 is oxidized at a temperature of 280° C. over a period of 120 mins. in air to produce brown $\gamma$-$Fe_2O_3$ pigment.

The following magnetic values are determined:
$I^H{}_c = 178$ Oe.
$M_s = 3815$ G.
specific surface area = 3.3 m²/g
average partical size 0.5 μm.

EXAMPLE 3 (COMPARATIVE EXAMPLE)

The magnetic values of the starting material for Examples 1 and 2 are determined. The magnetite Bayferrox 8610 has the following characteristics:
$I^H{}_c = 132$ Oe.
$M_s = 4900$ G.

EXAMPLE 4 (COMPARATIVE EXAMPLE)

Bayferrox 8610 is oxidized at a temperature of 250° C. for 120 mins. The resulting gamma-iron oxide has the magnetic values:
$I^H{}_c = 87$ Oe.
$M_s = 4150$ G.

What is claimed is:

1. A process for the production of highly-coercive isometric magnetic iron oxide pigment which comprises:
   (a) subjecting isometric $Fe_3O_4$ pigment produced in a wet process to oxidation and
   (b) subsequently reducing the oxidized pigment from (a) to produce highly-coercive $Fe_3O_4$ pigment.

2. A process according to claim 1 wherein oxidation in (a) is continued until $Fe_2O_3$ is produced.

3. A process according to claim 1 wherein oxidation in (a) is carried out with air at a temperature of from about 200° to 950° C.

4. A process according to claim 3 wherein the oxidation temperature is from 400° to 900° C.

5. A process according to claim 1 wherein reduction in (b) is carried out by contact with a reducing gas at a temperature of from about 200° to 700° C.

6. A process according to claim 5 wherein the reducing gas is hydrogen, natural gas or carbon monoxide.

7. A process according to claim 5 wherein the reducing gas is moist hydrogen.

8. A process according to claim 5 wherein the reduction temperature is from 300° to 500° C.

* * * * *